(No Model.)

A. C. SQUIRES.
DRESS SHIELD FORMER.

No. 391,432. Patented Oct. 23, 1888.

WITNESSES:
C. W. Benjamin
C. S. Scanlan

INVENTOR,
Arthur C. Squires
BY
W. F. Hapgood,
ATTORNEY.

UNITED STATES PATENT OFFICE.

ARTHUR C. SQUIRES, OF NEW YORK, N. Y.

DRESS-SHIELD FORMER.

SPECIFICATION forming part of Letters Patent No. 391,432, dated October 23, 1888.

Application filed May 24, 1888. Serial No. 274,923. (No model.)

*To all whom it may concern:*

Be it known that I, ARTHUR C. SQUIRES, a citizen of the United States, residing at New York, in the county and State of New York, have invented a new and useful Machine for Forming Fabrics to be Used in the Manufacture of Sweat-Shields for Ladies' Dresses, of which the following is a specification.

As at present manufactured, sweat-shields for dresses are produced by stretching the material of which they are composed until it conforms to the desired shape, when it is fixed by vulcanizing in the case of rubbered stockinet, or by sizing if any simple woven fabric is used. The result of this stretching is to reduce the thickness of the material to such an extent that it leaks and allows the perspiration to pass through, and also produces a very imperfect article in other respects, as the stretching being unequal the thickness of the shield will vary at different parts.

The object of my invention is to produce an apparatus which will shape the material, not by stretching it, but by so drawing it in the proper directions as by altering the angularity of the threads to cause them to conform to the general outlines of a series of the shields, which may subsequently be cut apart.

The mechanism by means of which I accomplish the above result consists of two sets of formers or molds whose construction and arrangement are shown in the accompanying drawings, wherein—

Figure 1:
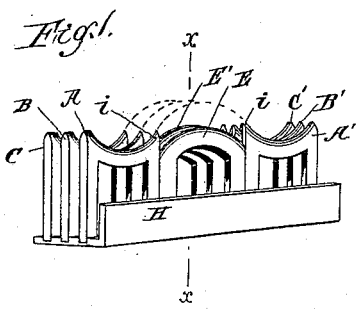
Figure 2:
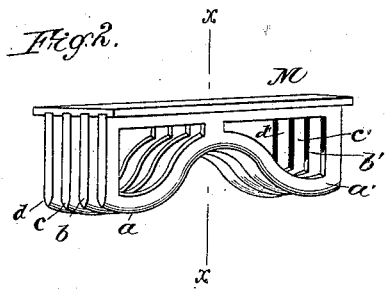
Figure 3:
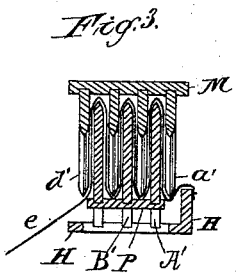
Figure 4:
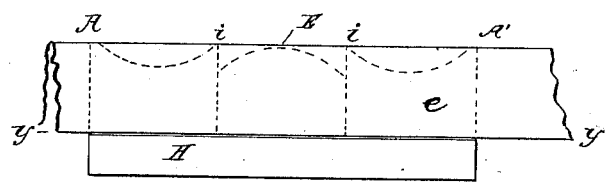
Figure 5:
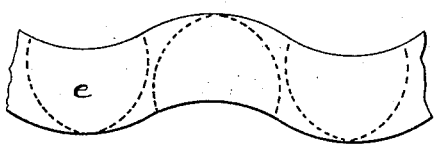
Figure 6:
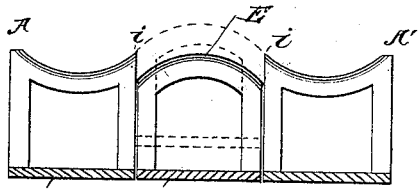

Figure 1 is a perspective view of the lower former; Fig. 2, a perspective view of the upper former; Fig. 3, a cross-section through line *x x*, Fig. 2, of the two forms as they appear when in operation on a piece of material. Fig. 4 shows a fold of the fabric as placed on the lower former ready to be operated upon. Fig. 5 shows the form the section of fabric in Fig. 1 assumes after the operation is completed, the form of the shields to be produced being shown in dotted lines. Fig. 6 is a longitudinal section of Fig. 1.

Upon a strong base-plate, H, are fixed a number of rows, A A' B B', &c., of thin plates or frames corresponding in width to the shields to be produced and having their upper edges of a circular concave form. Each of these plates is placed at an interval from the next one equal to its own width, and the several rows are separated from one another by spaces a little greater than the thickness of one of the plates. The number of these plates in each row will depend upon the width of the material to be operated upon, and must be an even number. In the intervals between the successive plates A A' B B', &c., in each row are other plates or frames, E E', fixed upon a separate base, P, and arranged to move perpendicularly through openings in the base H. These plates, however, have their upper or mold edges of a circular convex form, but of the same radius as the concaves of A A', &c.

The upper former, Fig. 2, consists of the base M, on which are fixed the plates $a\ a'\ b\ b'$, &c., one more in number than there are rows of plates in the lower former, Fig. 1, and with corresponding intervals of space between them. These plates have their longitudinal or mold edges in the form of a continuous series of regular reversed curves of the same radius as the curves of the plates A E A', but with the curves arranged in the reverse order— that is, in Fig. 1 the curves begin and end with a concave curve, while in the upper former the curves begin and end with a convex.

In the drawings I have shown three rows of molds in the lower former, Fig. 1, and four plates in the upper former, Fig. 2, as these are sufficient to demonstrate the operation of my invention; but as many more rows may be placed in the apparatus as convenience in operating or handling may render desirable.

To operate my new apparatus, I proceed as follows: The sliding sections E E' in Fig. 1 are all lowered until the highest part of their convex mold-edges is level with the ends *i i* of the adjoining sections A A', &c., as shown in Figs. 1 and 4. A length of the material to be operated upon, as rubbered stockinet or sized fabric of any suitable description, is now folded smoothly over the top of the first row of forms in Fig. 1 and down between the first and second row, then over the second row, and so on until the last row is reached, the folds being brought to the same depth in the spaces between each row. The position of the sections A E A' and of the fabric as placed upon them is shown in Fig. 4. The ends of the piece of fabric are then secured to the base H by any suitable means, and the upper former, Fig. 2, is now placed upon the lower former, the plates $a$ $a'$ $b$ $b'$ sliding down on each side of A A B B and within the folds of the fabric placed thereon. The whole apparatus is now placed in a double-acting press, which is so arranged that while the base H, with the sections A A' B B', &c., rests upon a stationary bed-plate, plungers moving upward through the same act upon the bases P of the sections E E' and force them upward, while at the same time the upper former, Fig. 2, is forced downward by a moving platen at a corresponding speed, and the pressure is continued until the section E arrives at the position shown in the dotted lines in Fig. 1, when the curve of its edge coincides with and continues the curves of A A', forming a continuous series of alternately-reversed curves similar to that formed by the mold edge of the upper former, Fig. 2, the lower edge of whose convex curve has in the meantime passed a corresponding distance below the fold-line of the fabric $y$ $y$, Fig. 4. This position of the two sets of formers is shown in section in Fig. 3, where $e$ represents the fabric being operated upon.

The result of the above operation is a number of connected bands of fabric whose outline is shown in Fig. 5, and it will be seen that the opposite movements of the upper former, Fig. 2, and the sections E E' do not stretch the material, which would increase its superficial area, but simply distort it from its original form of a straight band by gradually altering the original directions of the threads of which it is composed and produce a band of the same width and whose edges are parallel regular waved lines.

When the fabric has been formed in my new apparatus, the upper and lower formers are locked together and removed from the press to ovens, where the fabric is vulcanized, in the case of rubbered stockinet, or to drying-rooms to set the size where sized fabric is operated upon. When this is completed, the fabric is removed from the formers, and while still folded the shields are cut out by dies in the usual manner.

What I claim, and desire to secure by Letters Patent, is—

1. In a machine for forming material to be used in the manufacture of sweat-shields for dresses, a lower former composed of two or more rows of molds, each row consisting of a number of alternately stationary and sliding plates arranged edge to edge, the upper or mold edge of said stationary plates being of a circular concave form and of the sliding plates of a convex form, the different rows being placed parallel with one another and with an intervening space slightly greater than the thickness of the plates, in combination with an upper former consisting of a number of plates of the same thickness as the molds on the lower former and fixed upon a suitable base parallel with each other, and with intervals between them corresponding in width to the spaces of the lower former, said plates having their lower longitudinal edges in the form of a regular waved line whose curves are of equal radius but opposite direction and order of arrangement to those of the molds of the lower former, substantially as and for the purpose set forth.

2. In a machine for forming material to be used in the manufacture of sweat-shields for dresses, the base H, with two or more rows of concave forms, A A' B B', &c., fixed thereon, and the upper former having three or more compound forms, $a$ $a'$ $b$ $b'$, &c., in combination with the convex forms E E', fixed upon a separate base, P, and arranged to move perpendicularly between the forms A A' B B', substantially as described.

ARTHUR C. SQUIRES.

Witnesses:
M. D. HANOVER,
CHAS. S. SCANLAN.